United States Patent
Malik et al.

(10) Patent No.: US 7,826,862 B2
(45) Date of Patent: *Nov. 2, 2010

(54) METHODS AND APPARATUS FOR IMPROVED LOCATIONING IN A WIRELESS NETWORK

(75) Inventors: Ajay Malik, Santa Clara, CA (US); Vinh-Phuong Le, Fremont, CA (US); Mahender Vangati, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 618 days.

This patent is subject to a terminal disclaimer.

(21) Appl. No.: 11/770,387

(22) Filed: Jun. 28, 2007

(65) Prior Publication Data

US 2009/0005063 A1    Jan. 1, 2009

(51) Int. Cl.
*H04B 7/00* (2006.01)

(52) U.S. Cl. .................. 455/522; 455/456.1; 455/13.4; 455/115.3; 455/69

(58) Field of Classification Search .................. 455/522, 455/69, 41.2, 456.1, 440, 424, 453, 67.1, 455/423, 414.2, 404.2, 456.6, 229, 63, 421, 455/422.1; 370/338, 324
See application file for complete search history.

(56) References Cited

U.S. PATENT DOCUMENTS

| | | | |
|---|---|---|---|
| 7,383,051 B2 * | 6/2008 | Spain et al. | 455/456.1 |
| 2001/0016490 A1 * | 8/2001 | Martin-Leon et al. | 455/424 |
| 2002/0097181 A1 * | 7/2002 | Chou et al. | 342/357.06 |
| 2003/0067963 A1 * | 4/2003 | Miller et al. | 375/130 |
| 2004/0152471 A1 * | 8/2004 | MacDonald et al. | 455/456.1 |
| 2005/0136840 A1 * | 6/2005 | Molnar et al. | 455/63.1 |
| 2006/0153153 A1 * | 7/2006 | Bhagwat et al. | 370/338 |
| 2007/0026870 A1 * | 2/2007 | Spain et al. | 455/456.1 |
| 2007/0159994 A1 * | 7/2007 | Brown et al. | 370/324 |
| 2008/0051103 A1 * | 2/2008 | Goren et al. | 455/456.1 |
| 2008/0076430 A1 * | 3/2008 | Olson | 455/440 |
| 2008/0187188 A1 * | 8/2008 | Beletski et al. | 382/124 |
| 2008/0242339 A1 * | 10/2008 | Anderson | 455/522 |
| 2008/0285530 A1 * | 11/2008 | Dietrich et al. | 370/338 |
| 2009/0005064 A1 * | 1/2009 | Malik et al. | 455/456.1 |
| 2009/0221299 A1 * | 9/2009 | MacDonald et al. | 455/456.1 |

* cited by examiner

*Primary Examiner*—Tan Trinh

(57) ABSTRACT

Methods and systems are provided for determining the location of a first wireless device (e.g., a mobile unit) within a wireless network comprising a second wireless device (e.g., an access point). The method includes determining a signal strength contour associated with RF communication between the access point and the mobile unit, and adding a correction factor to the signal strength contour to produce a corrected signal strength contour, wherein the correction factor includes the sums of the differences between the transmit power and the antenna gain associated with the mobile unit and the access point. In an alternate scheme involving stored fingerprint data, a correction factor is introduced based on the differences between antenna gains and transmit power associated with the mobile unit under consideration and the mobile unit used for generating the fingerprint data. The systems and methods disclosed herein are applicable, for example, to networks operating in accordance with 802.11, RFID, WiMax, WAN, Bluetooth, Zigbee, UWB, and the like.

20 Claims, 2 Drawing Sheets

METHODS AND APPARATUS FOR IMPROVED LOCATIONING IN A WIRELESS NETWORK

TECHNICAL FIELD

The present invention relates to wireless local area networks (WLANs) and other networks incorporating RF elements and/or RF devices. More particularly, the present invention relates to methods for determining the physical location of wireless devices within a network.

BACKGROUND

There has been a dramatic increase in demand for mobile connectivity solutions utilizing various wireless components and WLANs. Such networks generally involve the use of wireless access points (APs) configured to communicate with mobile devices using one or more RF channels in accordance with various wireless standards and protocols.

It is often desirable to determine the physical location of a particular mobile device within a network. One way of accomplishing this task is to examine signal strength information related to the access points and/or the mobile units within the network environment, thus allowing the location to be inferred with an acceptable degree of accuracy.

In this regard, there are a number of known algorithms that use signal strength information (e.g., RSSI values) from a wireless device to help determine the location of another device. For example, in the 802.11 wireless environment, the signal strengths from the APs are typically used in combination with triangulation techniques to estimate the location of the mobile devices in the area.

Two popular methods of location prediction are the mathematical modeling approach and the "fingerprinting" approach. In the mathematical modeling approach, the AP transmit power and antenna gain are used to determine signal coverage, or a "heat map." In general, RSSI values between an AP and a mobile device are proportional to the distance of the mobile device from the AP. A mathematical model may thus be used to generate AP signal strength contours that correspond to the mobile device RSSI. The relationship between the mobile device signal strength and the AP signal strength are known; however, the coverage areas associated with the AP and the mobile device are not congruent (i.e., not the same shape and/or size). This results in significant prediction error in the mathematical model.

In the fingerprinting approach, a lookup table (fingerprint data) is populated using test data generated using a test mobile device. During real-time locationing, however, the actual mobile device under consideration might have much different RF properties than the mobile device that was used for fingerprint data collection.

Accordingly, there is a need for improved methods and systems for better determining the location of wireless devices in a network.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
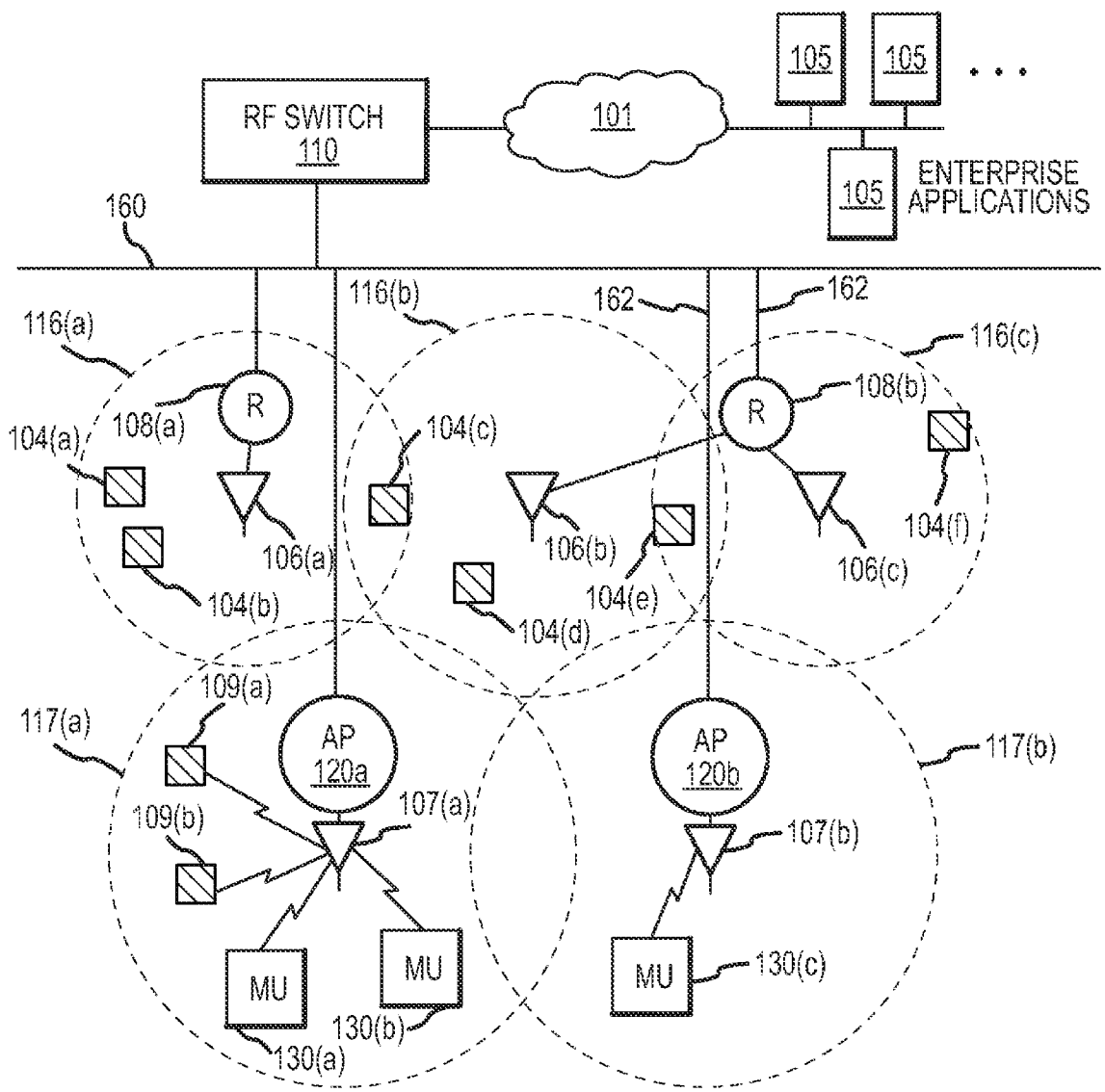
FIG. 1 is a conceptual overview of a wireless network useful in describing various embodiments.

The present invention relates to systems and methods for improved location determination within a wireless network. The described techniques are reciprocal, in that mobile units may be used to determine the location of access points, or access points may be used to determine the location of mobile units.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission and data formatting protocols and that the system described herein is merely one example embodiment of the invention.

For the sake of brevity, conventional techniques related to signal processing, data transmission, signaling, network control, the 802.11 family of specifications, wireless networks, RFID systems and specifications, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example," rather than "model." Although the figures may depict example arrangements of elements, additional intervening elements, devices, features, or components may be present in an embodiment of the invention.

Referring to FIG. 1, in an example system useful in describing the present invention, a switching device 110 (alternatively referred to as an "RF switch," "WS," or simply "switch") is coupled to a network 101 and 160 (e.g., an Ethernet network coupled to one or more other networks or devices) which communicates with one or more enterprise applications 105. One or more wireless access ports 120

(alternatively referred to as "access ports" or "APs") are configured to wirelessly connect to one or more mobile units 130 (or "MUs"). APs 120 suitably communicate with switch 110 via appropriate communication lines 162 (e.g., conventional Ethernet lines, or the like). Any number of additional and/or intervening switches, routers, servers and other network components may also be present in the system.

A number of RF tags ("RFID tags," or simply "tags") 104, 107 may also be distributed throughout the environment. These tags, which may be of various types, are read by a number of RFID readers (or simply "readers") 108 having one or more associated antennas 106 provided within the environment. The term "RFID" is not meant to limit the invention to any particular type of tag. The term "tag" refers, in general, to any RF element that can be communicated with and has an ID (or "ID signal") that can be read by another component. Readers 108, each of which may be stationary or mobile, are suitably connective via wired or wireless data links to a RF switch 110.

A particular AP 120 may have a number of associated MUs 130. For example, in the illustrated topology, MUs 130(a) and 130(b) are associated with AP 120(a), while MU 130(c) is associated with AP 120(b). One or more APs 120 may be coupled to a single switch 110, as illustrated.

RF Switch 110 determines the destination of packets it receives over network 104 and 101 and routes those packets to the appropriate AP 120 if the destination is an MU 130 with which the AP is associated. Each WS 110 therefore maintains a routing list of MUs 130 and their associated APs 120. These lists are generated using a suitable packet handling process as is known in the art. Thus, each AP 120 acts primarily as a conduit, sending/receiving RF transmissions via MUs 130, and sending/receiving packets via a network protocol with WS 110.

RF switch 110 can support any number of tags that use wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

A particular RFID reader 108 may have multiple associated antennas 106. For example, as shown in FIG. 1, reader 108(a) is coupled to one antenna 106(a), and reader 108(b) is coupled to two antennas 106(b) and 106(c). Reader 108 may incorporate additional functionality, such as filtering, cyclic-redundancy checks (CRC), and tag writing, as is known in the art.

Each antenna 106, 107 has an associated RF range 116, 117 106 (or "signal strength contour") which depends upon, among other things, the strength of the respective antenna, and may be defined by a variety of shapes, depending upon the nature of the antenna (i.e., the RF range need not be circular or spherical as illustrated in FIG. 1). An antenna 107 coupled to an AP 120 may also communicate directly with RFID tags (such as tags 109(a) and 109(b), as illustrated). It is not uncommon for RF ranges to overlap in real-world applications (e.g., doorways, small rooms, etc.). Thus, as shown in FIG. 1, read point 116(a) overlaps with read point 116(b), which itself overlaps with read point 116(c), and range 117(a) overlaps with range 117(b).

As described in further detail below, switch 102 includes hardware, software, and/or firmware capable of carrying out the functions described herein. Thus, switch 102 may comprise one or more processors accompanied by storage units, displays, input/output devices, an operating system, database management software, networking software, and the like. Such systems are well known in the art, and need not be described in detail. Switch 102 may be configured as a general purpose computer, a network switch, or any other such network host. In a preferred embodiment, controller or switch 102 is modeled on a network switch architecture but includes RF network controller software (or "module") whose capabilities include, among other things, the ability to allow configure and monitor readers 108 and antennas 106.

RF switch 110 may include a cell controller (CC) and an RFID network controller (RNC) (not shown). The RNC includes hardware and software configured to handle RFID data communication and administration of the RFID network components, while the CC includes hardware and software configured to handle wireless data (e.g., in accordance with IEEE 802.11) from the mobile units and access ports within wireless cells. In one embodiment, RF switch 110 includes a single unit with an enclosure containing the various hardware and software components necessary to perform the various functions of the CC and RNC as well as suitable input/output hardware interfaces to networks 101 and 160.

Figure 2:
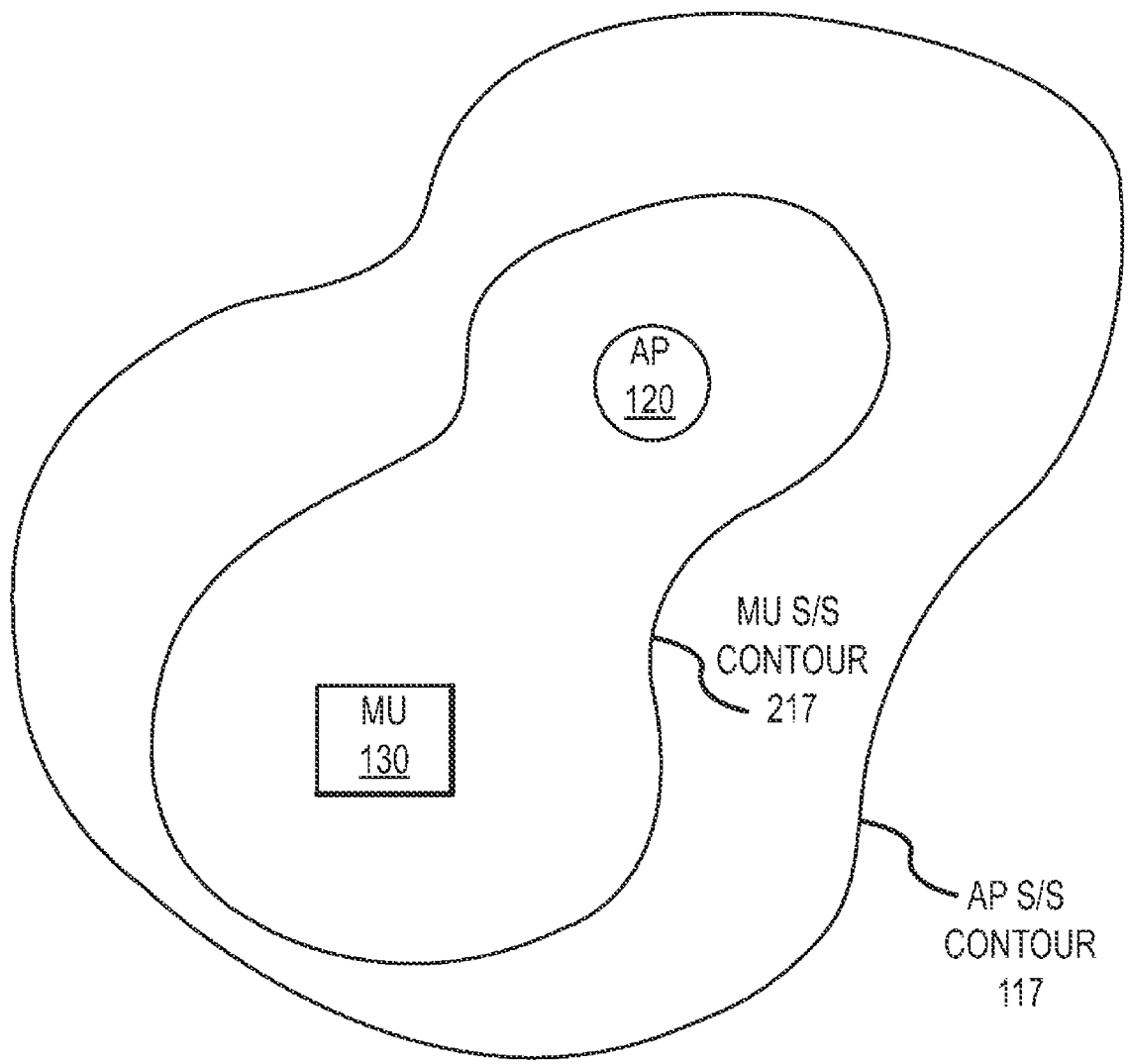
FIG. 2 is a conceptual diagram showing a mobile unit and an APs with exemplary RF contours.

Referring to the example conceptual view shown in FIG. 2, [ ] three access ports 120 (AP1, AP2, and AP3) or other RF devices are provided within an environment (which may be indoors and/or outdoors). It will be appreciated that a typical real-world environment may have many more such APs; three APs are depicted in this example solely for the purpose of clarity. The environment, which may correspond to a workplace, a retail store, a home, a warehouse, or any other such space, will typically include various physical features that affect the nature and/or strength of RF signals received and/or sent by the APs. Such feature include, for example, architectural structures such as doors, windows, partitions, walls, ceilings, floors, machinery, lighting fixtures, and the like. The present invention is not limited to two-dimensional layouts; it may be extended to three dimensional spaces as well.

Each AP 120 has an associated RF coverage area or signal strength contour 117, which corresponds to the effective range of its antenna or RF transmitter, as described in further detail below. These coverage areas may have any arbitrary shape or size, depending upon factors known in the art. For example, these coverage areas may be determined through a receiver signal strength indicator (RSSI) calculation, as is known in the art. APs 120 may comprise one or more processors accompanied by storage units, displays, input/output devices, an operating system, database management software, networking software, and the like. Such systems are well known in the art, and need not be described in detail here.

For wireless data transport, AP 114 may support one or more wireless data communication protocols—e.g., RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; GPRS; and proprietary wireless data communication protocols such as variants of Wireless USB.

Mobile unit (MU) 130 is also within the environment, wherein APs 120 are configured to wirelessly connect to MU 130. As shown, the [ ] three contours 117 may overlap to varying degrees. In the illustrated embodiment, for example, MU 130 falls within a region 202 where all three contours overlap. Stated another way, MU 130 is within the coverage range of all three APs.

As mentioned previously above, two popular locationing schemes include the mathematical modeling approach, and the fingerprinting approach. Methods in accordance with each embodiment will be described in turn.

In the mathematical modeling approach, the AP transmit power and antenna gain are part of the equation used to predict signal coverage. By virtue of the 802.11 standard, for example, the mobile device occasionally sends out a probe request packet on multiple channels in order to scan for a better AP with which to connect. In an infrastructure that is designed for locationing service, it is possible that multiple APs can detect and receive the probe request packets, thus the RSSI from the MU can be collected by the AP and reported to central management software for processing.

As is known, RSSI values are proportional to the distance from the MU to the associated AP. Thus, a mathematical model may be used to generate AP signal strength contours that correspond to the MU RSSI. The relationship between the MU signal strength and AP signal strength may be defined as:

$$\text{AP RSSI contour} = \text{MU transmit power} + \text{MU antenna gain} - \text{path loss} \quad (1)$$

$$\text{MU RSSI contour} = \text{AP transmit power} + \text{AP antenna gain} - \text{path loss} \quad (2)$$

In equation (1), the AP RSSI contour is the signal strength seen by the AP when the MU transmits. Likewise, the MU RSSI in equation (2) is the signal strength observed by the MU when the AP transmits. The path loss relates to the total loss due to environmental factors and the like, as is known in the art.

As shown in FIG. 2, the coverage 117 of MU 130 may be significantly different from the coverage 217 of AP 120. In the general case, they are not congruent. In the mathematical modeling approach, the method can generate equation (2) for locationing prediction; however, the actual MU transmit power in equation (1) is not generally known, as the two contours 117 and 217 are not coextensive or congruent. And thus the prediction algorithm will generate significant errors.

As an example of how such an error might occur, consider a method of determining the location of MU 130 via triangulation from the three APs 120. The triangulation is based on the coverage patterns of the APs and thus depends upon the transmit power and antenna gain of the APs. The triangulation prediction model can easily be done from the AP perspective because the modeling data is readily available in the RF switch or the application 105. However, if the RSSI for MU 130 is used for triangulation, then the transmit power and antenna gain for MU 130 should be considered. In practice, it is common that MU 130 transmit power and antenna gain is less than that of APs 120 because of size and form factor considerations. In free space, every 6 db difference in radiated power results in twice the distance error from the true position. This number (6 dB) is a realistic quantity since an AP typically has 3 dBi antenna gain and the MU typically has an antenna gain as low as −3 dBi for portable devices. Thus, the error is large for such locationing estimation.

In accordance with the present invention, in order to compensate for this error, the locationing modeling engine or other software module corrects these calculations. Specifically, an revised value for equation (2) is computed as:

$$\text{AP RSSI contour'} = \text{AP RSSI contour} + (\text{MU transmit power} - \text{AP transmit power}) + (\text{MU antenna gain} - \text{AP antenna gain}) \quad (3)$$

Thus a correction factor is generated and added to the traditional contour calculations, wherein the correction factor comprises the sums of the differences in transmit power and antenna gain between the AP and the MU. In general, all the APs in a building might exhibit different transmit powers and antenna gains. Equation (3) is thus preferably computed, and the resulting values stored, for each AP individually.

The MU transmit power and antenna gain are parameters that may be entered in the locationing modeling engine via a suitable user interface or through some pre-determined protocol between AP 120 and MU 130. For example, AP 120 may instruct MU 130 to run at a specific power level, thus eliminated the need to enter the MU transmit power and antenna information via the user interface.

With respect to the fingerprinting method of locationing, a similar correction factor is applied. This method is different in that locationing prediction is generated from a look-up table, rather than a mathematical model, where the look up table includes a set of fingerprint data (RSSI values) generated by a test MU. In this case, the actual MU being located will typically have different RF properties than the one used to populate the look-up table, and thus a correction factor is applied as follows:

$$\text{Fingerprint data RSSI'} = \text{Fingerprint data RSSI} + (\text{transmit power of MU2} - \text{transmit power of MU1}) + (\text{antenna gain of MU2} - \text{antenna gain of MU1}) \quad (4)$$

In equation (4), MU1 corresponds to the MU used for collecting fingerprint data, and MU2 corresponds to the MU1 being examined to determine its location. As can be seen a correction factor has been applied to the fingerprinting data, wherein the correction factor comprises the sum of the differences in transmit power and antenna gain between the two MUs.

The methods described herein are reciprocal, in that the principle of operation applies for the MU with respect to the AP, as well as for the AP with respect to the MU. In the interest of conciseness, however, only the operation in one direction will be described below—i.e., locating an MU given information from the nearby APs.

In the case of a 3-D implementation, the transmit power and antenna gain are determined as a function of x, y, and z, representing coordinates in three-dimensional space. Alternatively, a cylindrical or spherical coordinate system may be used.

While an 802.11-type environment is described above, the methods described apply to any locationing prediction that uses RSSI as a driving decision for computation, for example, RFID, WiMax, WAN, Bluetooth, Zigbee, UWB, and the like.

The methods described above may be performed in hardware, software, or a combination thereof For example, in one embodiment one or more software modules are configured as a "locationing module" executed on a general purpose computer having a processor, memory, I/O, display, and the like. This computer module may be included with an AP 120, an MU 130, an enterprise application 105, or RF switch 110.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method for locating a first wireless device within a wireless network comprising a second wireless device, wherein each of the first and second wireless devices have respective antenna gains and transmit powers, the method comprising the steps of:
   determining a signal strength contour associated with RF communication between the first wireless device and the second wireless device;
   adding a correction factor to the signal strength contour to produce a corrected signal strength contour, wherein the correction factor includes a sum of both the difference between the transmit powers of the wireless devices and the difference between the antenna gains of the wireless devices; and
   locating the wireless device with respect to the access point using the corrected signal strength contour.

2. The method of claim 1, wherein the first wireless device is a mobile unit, and the second wireless device is an access port.

3. The method of claim 2, wherein the method is performed individually for each access point.

4. The method of claim 2, wherein the step of determining the signal strength contour includes:
   generating a predetermined set of fingerprint data comprising receiver signal strength indicator (RSSI) values determined by a test mobile device interacting with the first wireless device, wherein the test mobile device has an associated antenna gain and transmit power.

5. The method of claim 4, wherein the step of adding a correction factor includes adding, to the fingerprint data, the sum of the difference between the transmit powers of the test mobile device and second wireless device and the difference between the antenna gains of the test mobile device and the second wireless device.

6. The method of claim 1, wherein the first wireless device is a mobile unit, and the second wireless device is a second mobile unit.

7. The method of claim 1, wherein the contour of the first wireless devices is not congruent with a signal strength contour of the second wireless device.

8. The method of claim 1, wherein the first wireless device is instructed to operate at a specific transmit power level for location modeling.

9. The method of claim 1, wherein the step of determining the signal strength contour includes:
   determining a first receiver signal strength indicator (RSSI) contour for the first wireless device as the sum of the transmit power of the second wireless device, the antenna gain of the second wireless device, and a path loss;
   determining a second RSSI contour for the second wireless device as the sum of the transmit power of the first wireless device, the antenna gain of the first wireless device, and the path loss.

10. A wireless network system comprising:
    a first wireless device;
    a second wireless device, wherein a signal strength contour of the first wireless device is not coextensive with a signal strength contour of the second wireless device; and
    a locationing module configured to identify a location of the second wireless device with respect to the first wireless device, the locationing module configured to determine a signal strength contour associated with RF communication between the first wireless device and the second wireless device, and add a correction factor to the first signal strength contour to produce a corrected signal strength contour, wherein the correction factor includes a sum of both the difference between the transmit powers of the first and second wireless devices and the difference between the antenna gains of the first and second wireless devices.

11. The system of claim 10, wherein the first wireless device is a mobile unit, and the second wireless device is an access port.

12. The method of claim 11, wherein the locationing module computes the signal strength contour by generating a predetermined set of fingerprint data comprising receiver signal strength indicator (RSSI) values determined by a test mobile device interacting with the first wireless device, wherein the test mobile device has an associated antenna gain and transmit power.

13. The method of claim 12, wherein the correction factor includes adding, to the fingerprint data, the sum of the difference between the transmit powers of the test mobile device and second wireless device and the difference between the antenna gains of the test mobile device and the second wireless device.

14. The system of claim 10, wherein the first wireless device is a mobile unit, and the second wireless device is a second mobile unit.

15. The system of claim 10, wherein the contour of the first wireless devices is not congruent with a signal strength contour of the second wireless device.

16. The system of claim 10, wherein an access point associated with the locationing module instructs the first wireless device to operate at a specific transmit power level for location modeling.

17. The system of claim 10, wherein the locationing module computes the signal strength contour by determining a first receiver signal strength indicator (RSSI) contour for the first wireless device as the sum of the transmit power of the second wireless device, the antenna gain of the second wireless device, and a path loss; and determining a second RSSI contour for the second wireless device as the sum of the transmit power of the first wireless device, the antenna gain of the first wireless device, and the path loss.

18. The system of claim 17, wherein contours are determined individually for each access point.

19. A locationing module for determining a location of a mobile unit with respect to an access point associated therewith, the locationing module configured to determine a signal strength contour associated with RF communication between the access point and the mobile unit, and add a correction factor to the signal strength contour to produce a corrected signal strength contour, wherein the correction factor includes a sum of both the difference between the transmit powers of the mobile unit and access point and the difference between the antenna gains of the mobile unit and the access point, wherein the locationing module uses the corrected signal strength contour to locate the mobile unit.

20. The module of claim 19, wherein the mobile unit and access point are configured to operate within a 802.11 environment.

* * * * *